United States Patent
Tessaro et al.

(10) Patent No.: US 12,031,497 B2
(45) Date of Patent: Jul. 9, 2024

(54) SYSTEM AND METHOD FOR A VIRTUAL TURBOCHARGER SPEED SENSOR USING NEURAL NETWORKS

(71) Applicants: Iron Tessaro, Curitiba (BR); Samuel Giatti, Torslanda (BR); VOLVO TRUCK CORPORATION, Gothenburg (SE)

(72) Inventors: Iron Tessaro, Curitiba (BR); Samuel Giatti, Torslanda (BR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/755,249

(22) PCT Filed: Oct. 25, 2019

(86) PCT No.: PCT/IB2019/059190
§ 371 (c)(1),
(2) Date: Apr. 25, 2022

(87) PCT Pub. No.: WO2021/079179
PCT Pub. Date: Apr. 29, 2021

(65) Prior Publication Data
US 2022/0356855 A1 Nov. 10, 2022

(51) Int. Cl.
*F02D 41/24* (2006.01)
*G06N 3/08* (2023.01)

(52) U.S. Cl.
CPC .......... *F02D 41/2438* (2013.01); *G06N 3/08* (2013.01); *F02D 2200/023* (2013.01);
(Continued)

(58) Field of Classification Search
CPC ......... F02D 41/1405; F02D 2200/0614; F02D 2200/0618; F02D 2200/0624;
(Continued)

(56) References Cited

U.S. PATENT DOCUMENTS 6,236,908 B1 5/2001 Cheng et al.
6,405,122 B1 6/2002 Yamaguchi
(Continued)

FOREIGN PATENT DOCUMENTS

CN 1609429 A 4/2005
CN 101048584 A 10/2007
(Continued)

OTHER PUBLICATIONS

Ivan Arsie, Andrea Cricchio, Matteo De Cesare, Francesco Lazzarini, Cesare Pianese, Marco Sorrentino, Neural network models for virtual sensing of NOx emissions in automotive diesel engines with least square-based adaptation, Control Engineering Practice, vol. 61, 2017, pp. 11-20, ISSN 0967-0661, https://doi.*
(Continued)

*Primary Examiner* — Ngoc T Nguyen
(74) *Attorney, Agent, or Firm* — Venable LLP; Jeffri A. Kaminski

(57) ABSTRACT

Systems, methods, and computer-readable storage media for emulating a turbocharger speed sensor of a turbocharger in an engine. A processor executing the method can receive data from a plurality of sensors in the engine, wherein the data includes: an exhaust manifold pressure of the engine; an exhaust mass flow of the engine; and an injection angle of fuel in the engine. The processor enters the data as inputs into an artificial neural network, where the artificial neural network is trained to receive the inputs and output a speed of the turbocharger of the engine, then receives an output from the artificial neural network which is the speed of the turbocharger.

27 Claims, 4 Drawing Sheets

(52) U.S. Cl.
CPC .................. *F02D 2200/024* (2013.01); *F02D 2200/0414* (2013.01); *F02D 2200/0618* (2013.01); *F02D 2200/1002* (2013.01); *F02D 2200/101* (2013.01); *F02D 2200/703* (2013.01)

(58) Field of Classification Search
CPC ....... F02D 2200/101; F02D 2200/0703; F02D 2200/023; F02D 2200/0414
See application file for complete search history.

(56) References Cited

U.S. PATENT DOCUMENTS

| | | | |
|---|---|---|---|
| 6,539,714 | B1 | 4/2003 | Wang |
| 2003/0216856 | A1 | 11/2003 | Jacobson |
| 2003/0217021 | A1 | 11/2003 | Jacobson |
| 2006/0032224 | A1 | 2/2006 | Akins et al. |

FOREIGN PATENT DOCUMENTS

| | | |
|---|---|---|
| CN | 101331504 A | 12/2008 |
| CN | 102330595 A | 1/2012 |
| CN | 109253884 A | 1/2019 |
| EP | 3067539 A1 | 9/2016 |

OTHER PUBLICATIONS

JongmyungKim,JihwanPark,SeunghyupShin,YongjooLee,Kyoungdoug Min,etal..PredictionofengineNOxforvirtualsensorusingdeepneuralnetworkandgeneticalgorithm.Oil&GasScienceand Technology-Revued' IFPEnergiesnouvelles,2021,76,pp.72. 10.2516/ogst/2021054. hal-03445336.*

Hanzevack, E.L. & Long, T.W. & Atkinson, Christopher & Traver, M.. (1997). Virtual sensors for spark ignition engines using neural networks. 1. 669-673 vol. 1. 10.1109/ACC.1997.611885.*

International Search Report and Written Opinion dated Jul. 20, 2020 in corresponding International PCT Application No. PCT/IB2019/059190, 13 pages.

"Controls for Modern Diesel Engines", Dieselnet Technology Guide, XX, XX, Dec. 31, 2002 (Dec. 31, 2002), pp. 1-11, XP001116151, p. 8-p. 9.

Anonymous: "Backpropagation—Wikipedia", Jun. 25, 2019 (Jun. 25, 2019), XP055712117, Retrieved from the Internet: URL:https://web.archive.org/web/20190625235146/, https://en.wikipedia.org/wiki/Backpropagation [retrieved on Jul. 6, 2020], p. 1-p. 4.

J.-A Kessel et al: "Modelling and Real-Time Simulation of a Turbocharger with Variable Turbine Geometry (VTG) Reprinted From: 1998 Variable Valve Actuation and Power Boost (SP-1346) International Congress and Exposition", Jan. 23, 1998 (Jan. 23, 1998), pp. 776-5760, XP055712230, Retrieved from the Internet: URL:https://doi.org/10.4271/980770 [retrieved on Jul. 7, 2020], p. 3-p. 10.

Kim HJ, Park SH, Lee CS. Influence of the fuel spray angle and the injection strategy on the emissions reduction characteristics in a diesel engine. Proceedings of the Institution of Mechanical Engineers, Part D: Journal of Automobile Engineering. 2015;229(5):563-573.

Armin, Mahbod & Gholinia, Mosayeb & Pourfallah, Mohsen & Ranjbar, Ali. (2021). Investigation of the fuel injection angle/time on combustion, energy, and emissions of a heavy-duty dual-fuel diesel engine with reactivity control compression ignition mode. Energy Reports. 7. 5239-5247. 10.1016/j.egyr.2021.08.115.

Chinese Office Action dated Feb. 20, 2024 in corresponding Chinese Patent Application No. 201980101517.0, 27 pages.

* cited by examiner

SYSTEM AND METHOD FOR A VIRTUAL TURBOCHARGER SPEED SENSOR USING NEURAL NETWORKS

CROSS-REFERENCE TO RELATED APPLICATIONS

This application is a U.S. National Stage application of PCT/IB2019/059190, filed Oct. 25, 2019 and published on Apr. 29, 2021, as WO 2021/079179 A1, all of which is hereby incorporated by reference in its entirety.

BACKGROUND

1. Technical Field

The present disclosure relates to emulating a turbocharger sensor within an engine, and more specifically to configuring a neural network to virtually emulate a turbocharger sensor using specific inputs.

2. Introduction

A turbocharger for a vehicle engine operates by pushing additional air into the engine using an air compressor, allowing the cylinders of the engine to fire faster and resulting in increased speed of the vehicle. The exhaust gases from the engine's burning of the fuel pass a turbine, and the turbine in turn drives the air compressor, resulting in a feedback loop powered by the otherwise wasted gases of the exhaust. A turbocharger sensor can measure the speed of the turbocharger. More specifically, the turbocharger sensor can measure how fast the air compressor and/or the turbine are spinning and pushing air into the engine.

However, sensors add both expense and weight to a vehicle and are an additional point of failure, which are technical problems when trying to increase fuel efficiency, decrease points of failure, and increase knowledge of component status within a vehicle.

SUMMARY

Disclosed are systems, methods, and non-transitory computer-readable storage media which provide a technical solution to the technical problem described. A method for emulating a turbocharger speed sensor of a turbocharger in an engine configured as disclosed herein can include: receiving, at a processor, data from a plurality of sensors in the engine, wherein the data comprises: an exhaust manifold pressure of the engine; an exhaust mass flow of the engine; and an injection angle of fuel in the engine; entering, via the processor, the data as inputs into an artificial neural network, wherein the artificial neural network is trained to receive the inputs and output a speed of the turbocharger of the engine; and receiving, at the processor, the speed of the turbocharger from the artificial neural network.

A system configured to perform the concepts disclosed herein can include: an engine with a turbocharger; an exhaust manifold pressure sensor which detects exhaust manifold pressure of the engine; an exhaust mass flow sensor which detects exhaust mass flow of the engine; an injection angle sensor which detects a fuel injection angle of the engine; and a processor which: receives, as inputs: the exhaust manifold pressure from the exhaust manifold pressure sensor; the exhaust mass flow from the exhaust mass flow sensor; and the fuel injection angle from the injection angle sensor; enters inputs into an artificial neural network, wherein the artificial neural network is trained to receive the inputs and output a speed of the turbocharger; and determines a speed of the turbocharger using the artificial neural network.

A vehicle configured as disclosed herein can include: an engine with a turbocharger; an exhaust manifold pressure sensor which detects exhaust manifold pressure of the engine; an exhaust mass flow sensor which detects exhaust mass flow of the engine; an injection angle sensor which detects a fuel injection angle of the engine; and a processor which: receives, as inputs: the exhaust manifold pressure from the exhaust manifold pressure sensor; the exhaust mass flow from the exhaust mass flow sensor; and the fuel injection angle from the injection angle sensor; enters inputs into an artificial neural network, wherein the artificial neural network is trained to receive the inputs and output a speed of the turbocharger; and determines a speed of the turbocharger using the artificial neural network.

A method for emulating a turbocharger speed sensor of a turbocharger in an engine as disclosed herein can include: receiving, at a processor, data from a plurality of sensors in the engine; entering, via the processor, the data as inputs into an artificial neural network, wherein the artificial neural network is trained to receive the inputs and output a speed of the turbocharger of the engine; and receiving, at the processor, the speed of the turbocharger from the artificial neural network.

A vehicle configured as disclosed herein can include: an engine with a turbocharger; an exhaust manifold pressure sensor which detects exhaust manifold pressure of the engine; and a processor which: receives, as input, the exhaust manifold pressure from the exhaust manifold pressure sensor; enters the input into an artificial neural network, wherein the artificial neural network is trained to receive the input and output a speed of the turbocharger; and determines a speed of the turbocharger using the artificial neural network.

A vehicle configured as disclosed herein can include: an engine with a turbocharger; an exhaust mass flow sensor which detects exhaust mass flow of the engine; and a processor which: receives, as input, the exhaust mass flow from the exhaust mass flow sensor; enters the input into an artificial neural network, wherein the artificial neural network is trained to receive the input and output a speed of the turbocharger; and determines a speed of the turbocharger using the artificial neural network.

A vehicle configured as disclosed herein can include: an engine with a turbocharger; an injection angle sensor which detects a fuel injection angle of the engine; and a processor which: receives, as input, the fuel injection angle from the injection angle sensor; enters the input into an artificial neural network, wherein the artificial neural network is trained to receive the input and output a speed of the turbocharger; and determines a speed of the turbocharger using the artificial neural network.

DETAILED DESCRIPTION

Figure 1:
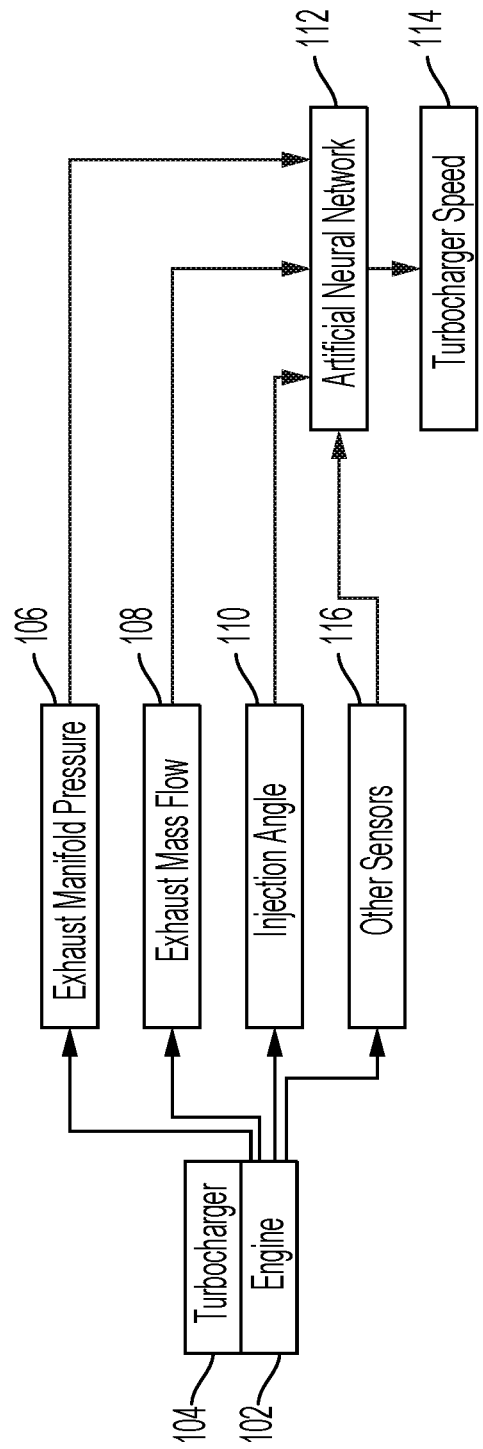
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

To solve the technical problems identified above, specifically a turbocharger speed sensor adding both expense and weight to a vehicle, as well as being an additional point of failure, a vehicle configured as disclosed herein can identify the speed of a turbocharger without having a turbocharger speed sensor present in the vehicle. This is accomplished by gathering data using other sensors within the vehicle, inputting the data from those other sensors into an artificial neural network being executed by a processor, such that the processor emulates a turbocharger speed sensor and outputs the speed of the turbocharger.

Turbocharger speed sensor emulation, also known as a virtual turbocharger speed sensor, configured as disclosed herein is accomplished by using specific data inputs which, when processed for correlations to test data, allow a neural network emulating a turbocharger speed sensor to be modeled and generated. The neural network can then be converted to computer-readable instructions (i.e., "code," or an "artificial neural network" based on the neural network) which is saved in a non-transitory computer-readable medium until the processor needs to execute the instructions. At that point, the processor can retrieve the computer-readable instructions from the non-transitory computer-readable medium, receive sensor data from other sensors in the vehicle, and emulate a turbocharger speed sensor.

The specific sensor data which can be input into the artificial neural network to emulate the turbocharger speed sensor can include:
- boost pressure
- engine exhaust temperature
- air mass flow
- boost temperature
- ambient air pressure
- engine speed
- piston cooling jet pressure
- air inlet temperature
- coolant temperature
- fuel flow
- oil pressure
- torque value
- exhaust manifold pressure
- exhaust mass flow
- injection angle In some configurations, each of these pieces of sensor data can have a respective sensor, and in other configurations multiple pieces of sensor data can be received from/generated by a respective sensor. Systems and vehicles configured according to this disclosure can use combinations or portions of the sensor data from this list as inputs to the artificial neural network, which emulates a turbocharger speed sensor and outputs a speed of the turbocharger.

The artificial neural network can be trained by a process which includes:

1) Running a diesel engine turbocharger with instruments and sensors in a laboratory over multiple routes/cycles, thereby collecting behavior/sensor data with a real engine 2) Running a relevance test of the sensor data, where the inputs are tested separately to sort the inputs based on how much influence they have on the turbocharger speed.

3) Optimizing the number of inputs by selecting, from all of the possible input candidates, those inputs which are the minimum necessary to train a model without losing accuracy. This can be done by training multiple identical neural networks with a progressive reduction of used inputs. The removal of inputs is executed in order of relevance until a minimum threshold of accuracy is reached, then the inputs just before that minimum threshold are selected as the preferred outputs.

4) Training a neural network using the optimum set of inputs and the training data through multiple scenarios, with each scenario resulting in a distinct neural network. This process can be executed multiple types (e.g., 200+), resulting in multiple neural networks. The system can then use predefined metrics to identify the best trained neural network.

5) The system converts the best trained neural network into a different format—namely into a programming language used by an Engine Control Unit (ECU), which is a processor operating within the engine. The ECU can, for example, control timing and operations within the engine.

6) The original software of the ECU is incremented (e.g., modified to include or replaced) with the new piece of code that contains the best trained neural network. At this point the ECU is configured to execute the artificial neural network.

7) If additional testing of the ECU is desired, the signal generated by the ECU's embedded neural network can be compared to a real turbocharger speed sensor operating within a laboratory-based engine. This can ensure that the inputs to the ECU result in the correct turbocharger speed and that the artificial neural network is properly configured.

8) If yet further testing is needed, CPU (Computer Processor Unit) effort, memory, and other physical elements which enable the artificial neural network can also be evaluated for safety compliance, accuracy, etc. This further testing can also occur in a real vehicle test, with a vehicle equipped with both an artificial neural network and a real turbocharger speed sensor, and comparing the outputs to ensure a match.

FIG. 1 illustrates an example system embodiment. As illustrated, an engine 102 of a vehicle (such as a car, truck, etc.) has a turbocharger 104. Also within the engine are multiple sensors which record data such as exhaust manifold pressure 106, exhaust mass flow 108, the injection angle 110 of fuel entering the engine, as well as other sensors 116. The data from these sensors is used as inputs to an artificial neural network 112. The artificial neural network 112 described herein is modeled and programmed to emulate a turbocharger speed sensor of the turbocharger 104 within the engine 102, outputting a turbocharger speed 114 of the turbocharger 104.

That is, the engine 102 contains multiple sensors which provide data 106, 108, 110 about the engine 102 performance and current state, but to reduce costs/weight/points of failure, the vehicle does not contain a turbocharger speed sensor. Instead, a processor is configured to receive data (such as the exhaust manifold pressure 106, the exhaust mass flow 108, and the injection angle 110) from sensors in the engine 102, as well as data from other sensors 116. The data received is then input into the processor, which executes an artificial neural network 112 programmed such that it can be executed by a processor within the vehicle. The processor executing the artificial neural network 112 code using the sensor data 106, 108, 110, 116 is a virtual sensor, or emulator, emulating a turbocharger speed sensor, and outputs the speed 114 of the turbocharger 104.

Figure 2:
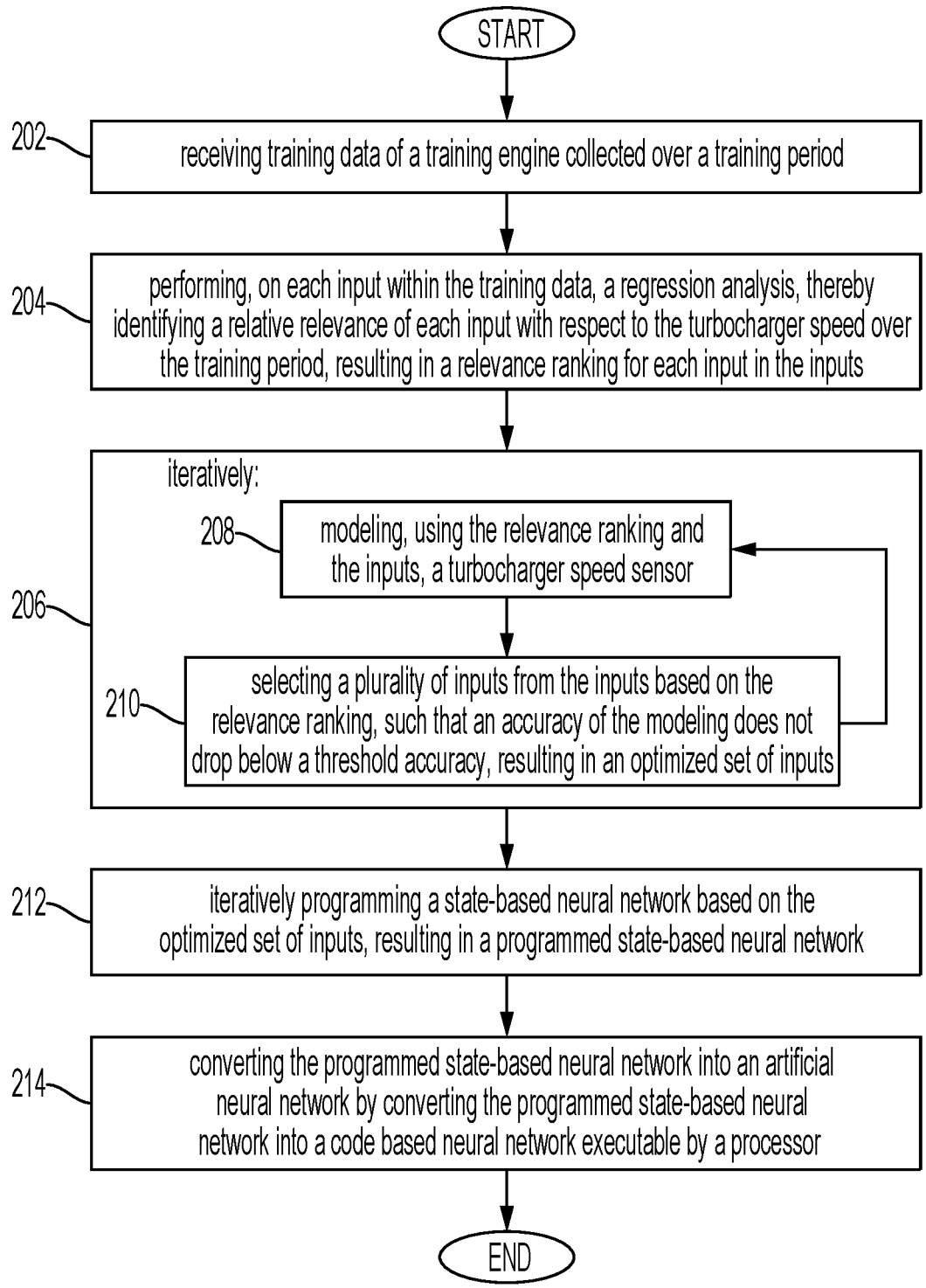
FIG. 2 illustrates an example method of training an artificial neural network to emulate a turbocharger speed sensor.

FIG. 2 illustrates an example method of training an artificial neural network to emulate a turbocharger speed sensor. The steps outlined herein are exemplary and can be implemented in any combination thereof, including combinations that exclude, add, or modify certain steps.

As illustrated, the artificial neural network is trained through multi-stage iterative process. The first stage is receiving training data of a training engine collected over a training period (202). In other words, the system collects real-world sensor-data from sensors (including a turbocharger speed sensor) in a vehicle as the vehicle is run through various scenarios. For example, the vehicle could drive a known route with many known sensors (including the turbocharger sensor), and data from those sensors can be recorded during the route's traverse. In some cases, the same route may be traversed multiple times. Whether a single traverse of a single route, multiple traverses of a single route, multiple routes which are each traversed a single time, or multiple routes which are each traversed at least once, the data is collected over one or more training periods. Alternatively, an engine can be tested in a lab over multiple cycles which emulate routes, thereby providing simulated data needed to train the artificial neural network.

The system then identifies correlations between the turbocharger speed sensor and the other sensors. As illustrated, this occurs by performing, on each input within the training data, a regression analysis, thereby identifying a relative relevance of each input with respect to the turbocharger speed over the training period, resulting in a relevance ranking for each input in the inputs (204). The resulting correlation outputs can be, for example, weights for each sensor across multiple situations and scenarios. Because the correlations are not constant across the multiple situations and scenarios, a linear equation using the relevance rankings/correlation parameters may not be ideal. Preferably the relevance rankings are instead used to model and train a virtual/emulated turbocharger speed sensor, where different weights can be applied to different sensor data based upon values of other sensors.

Modeling and training the virtual/emulated turbocharger speed sensor is an iterative process (206) of: modeling, using the relevance ranking and the inputs, a turbocharger sensor (208), and selecting a plurality of inputs from the inputs based on the relevance ranking, such that an accuracy of the modeling does not drop below a threshold accuracy, resulting in an optimized set of inputs (210). As illustrated, this process can repeat as many times as needed to identify a best model through linear optimization (such as least-squares optimization) or other optimization scheme (such as convex optimization). In some cases, this process to identify the best model may not be iterative, such that the model accurately predicts (above the threshold accuracy) a best way to predict turbocharger speed using the other sensor data in an optimized manner in a single iteration.

The system then iteratively programs a state-based neural network based on the optimized set of inputs, resulting in a programmed state-based neural network (212). In some configurations, the process of converting the generated model to a programmed neural network is not iterative, such that the neural network is programmed in a single, non-iterative process. The programmed state-based neural network is then converted into an artificial neural network by converting the programmed state-based neural network into a code based neural network executable by a processor. In other words, the state-based neural network is converted from a state-based configuration into code which can be executed by a processor, the executable code forming the artificial neural network described herein.

Figure 3:
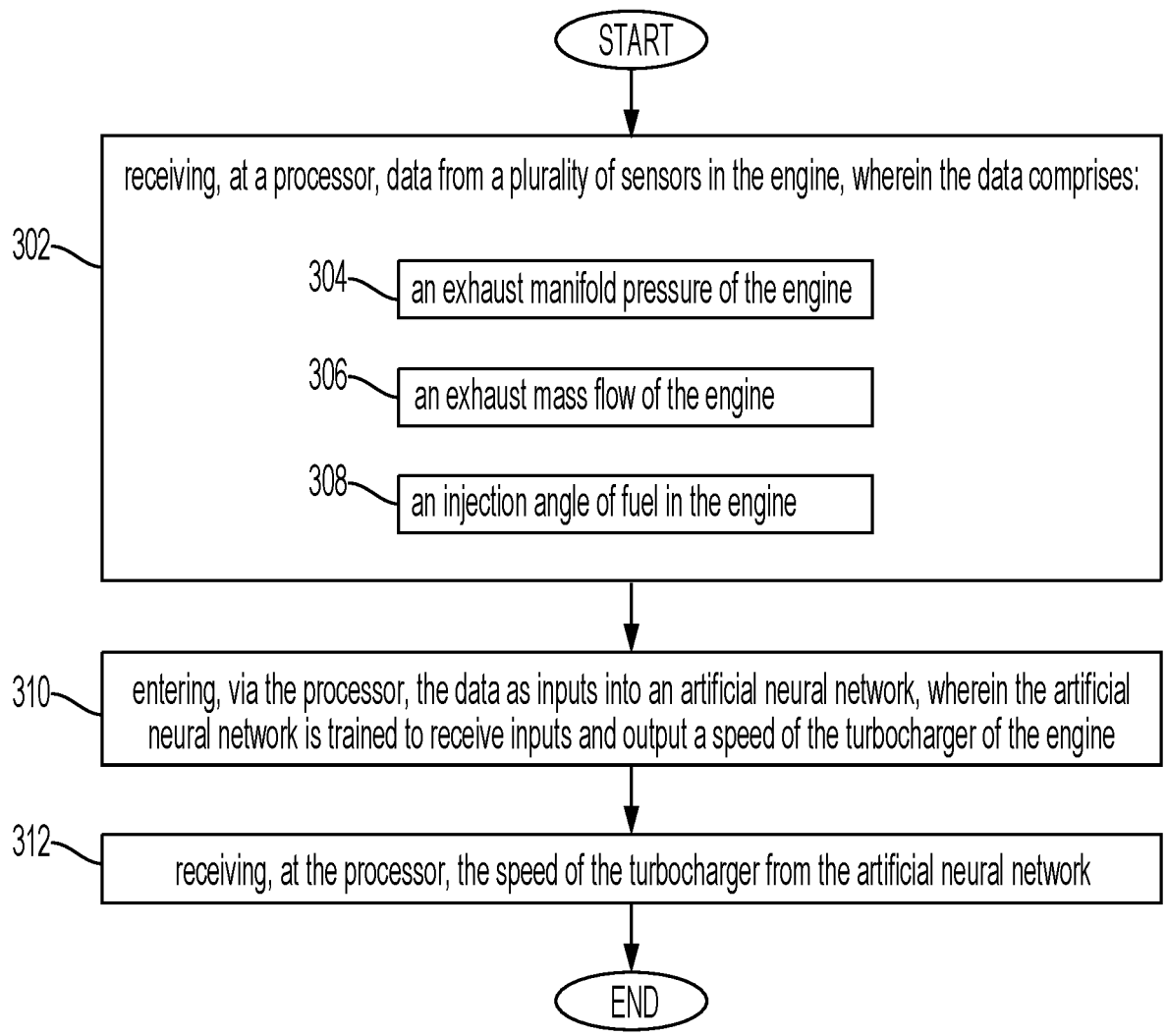
FIG. 3 illustrates a method of emulating a turbocharger speed sensor using an artificial neural network.

FIG. 3 illustrates a method of emulating a turbocharger speed sensor using an artificial neural network. The steps outlined herein are exemplary and can be implemented in any combination thereof, including combinations that exclude, add, or modify certain steps.

As illustrated, the method can include receiving, at a processor, data from a plurality of sensors in the engine (302), wherein the data comprises: an exhaust manifold pressure of the engine (304), an exhaust mass flow of the engine (306), and an injection angle of fuel in the engine (308). The engine can be any type of engine with a turbocharger, such as a diesel engine, gasoline engine, or other fuel-type engine. Additional examples of data which can be received from sensors can include one or more of: a boost pressure of the engine, a boost temperature of the engine, a piston cooling jet pressure of pistons in the engine, a coolant temperature of coolant in the engine, a torque value of the pistons in the engine, an engine exhaust temperature of the engine, an ambient air pressure, an engine speed of the engine, an air inlet temperature of the engine, a fuel flow of the engine, and an oil pressure of the engine. However, the plurality of sensors excludes a turbocharger speed sensor associated with the turbocharger in the engine.

The data is entered, via the processor, as inputs into an artificial neural network, wherein the artificial neural network is trained to receive the inputs and output a speed of the turbocharger of the engine (310). The artificial neural network can be trained by: receiving, at a training processor, training data of a training engine, the training data comprising sensor information collected over a training period of the training engine, the sensor information comprising inputs to the training engine which correspond to the data of the engine; receiving, at the training processor from a turbocharger speed sensor, training turbocharger data; performing, via the training processor on each input within the sensor information, a regression analysis, thereby identifying a relative relevance of each input with respect to the training turbocharger data, resulting in a relevance ranking for each input in the inputs; iteratively, via the training processor: modeling, using the relevance ranking and the inputs, the turbocharger speed sensor; and selecting a plurality of inputs from the inputs based on the relevance ranking, such that an accuracy of the modeling does not drop below a threshold accuracy, resulting in an optimized set of inputs; iteratively, via the training processor, programming a state-based neural network based on the optimized set of inputs, resulting in a programmed state-based neural network; and converting, via the training processor, the programmed state-based neural network into the artificial neural network by converting the programmed state-based neural network into a code based neural network executable by the processor.

In some configurations, the illustrated method can further include: retrieving, at the processor from an external non-transitory computer-readable medium, the artificial neural network, such that executable code of the artificial neural network can be executed by the processor.

Figure 4:
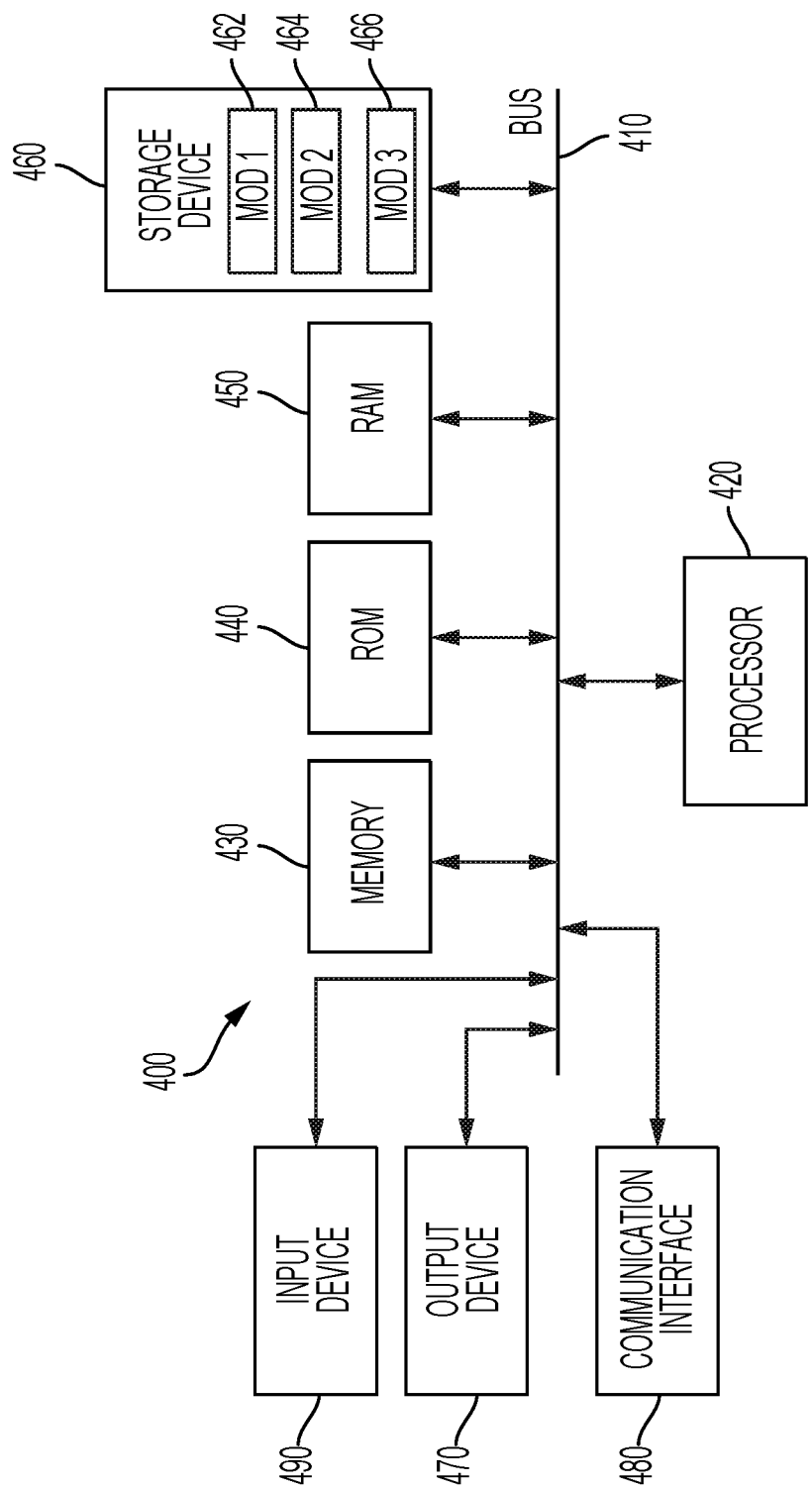
FIG. 4 illustrates an example method embodiment.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420.

The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMS) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method for emulating a turbocharger speed sensor of a turbocharger in an engine, the method comprising:
   receiving, at a processor, data from a plurality of sensors in the engine, wherein the data comprises:
      an exhaust manifold pressure of the engine;
      an exhaust mass flow of the engine; and
      an injection angle of fuel in the engine;
   entering, via the processor, the data as inputs into an artificial neural network;
   receiving, at the processor, the speed of the turbocharger from the artificial neural network, wherein the artificial neural network is trained to receive the inputs and output the speed of the turbocharger; and
   modifying a rate of speed of cylinders in the engine based on the speed of the turbocharger.

2. The method of claim 1, wherein the data further comprises:
   a boost pressure of the engine;
   a boost temperature of the engine;
   a piston cooling jet pressure of pistons in the engine;
   a coolant temperature of coolant in the engine; and
   a torque value of the pistons in the engine.

3. The method of claim 2, wherein the data further comprises:
   an engine exhaust temperature of the engine;
   an ambient air pressure;
   an engine speed of the engine;
   an air inlet temperature of the engine;
   a fuel flow of the engine; and
   an oil pressure of the engine.

4. The method of claim 1, wherein the artificial neural network is trained via a process comprising:
   receiving, at a training processor, training data of a training engine, the training data comprising sensor information collected over a training period of the training engine, the sensor information comprising inputs to the training engine which correspond to the data of the engine;

receiving, at the training processor from a turbocharger speed sensor, training turbocharger data;

performing, via the training processor on each input within the sensor information, a regression analysis, thereby identifying a relative relevance of each input with respect to the training turbocharger data, resulting in a relevance ranking for each input in the inputs;

iteratively, via the training processor:
modeling, using the relevance ranking and the inputs, the turbocharger speed sensor; and
selecting a plurality of inputs from the inputs based on the relevance ranking, such that an accuracy of the modeling does not drop below a threshold accuracy, resulting in an optimized set of inputs;

iteratively, via the training processor, programming a state-based neural network based on the optimized set of inputs, resulting in a programmed state-based neural network; and converting, via the training processor, the programmed state-based neural network into the artificial neural network by converting the programmed state-based neural network into a code based neural network executable by the processor.

5. The method of claim 1, wherein the engine is a diesel engine.

6. The method of claim 1, further comprising:
retrieving, at the processor from an external non-transitory computer-readable medium, the artificial neural network, such that executable code of the artificial neural network can be executed by the processor.

7. The method of claim 1, wherein the plurality of sensors excludes a turbocharger speed sensor associated with the turbocharger in the engine.

8. A system comprising:
an engine with a turbocharger;
an exhaust manifold pressure sensor which detects exhaust manifold pressure of the engine;
an exhaust mass flow sensor which detects exhaust mass flow of the engine;
an injection angle sensor which detects a fuel injection angle of the engine; and
a processor which:
receives, as inputs:
the exhaust manifold pressure from the exhaust manifold pressure sensor;
the exhaust mass flow from the exhaust mass flow sensor; and
the fuel injection angle from the injection angle sensor;
enters inputs into an artificial neural network;
determines a speed of the turbocharger using the artificial neural network, wherein the artificial neural network is trained to receive the inputs and output the speed of the turbocharger; and
modifies a rate of speed of cylinders in the engine based on the speed of the turbocharger.

9. The system of claim 8, further comprising:
a boost pressure sensor;
a boost temperature sensor;
at least one piston cooling jet pressure sensor;
a coolant temperature sensor; and
a torque value sensor.

10. The system of claim 9, wherein the inputs further comprise sensor data from the boost pressure sensor, the boost temperature sensor, the at least one piston cooling jet pressure sensor, the coolant temperature sensor, and the torque value sensor.

11. The system of claim 9, further comprising:
an engine exhaust temperature sensor;
an ambient air pressure sensor;
an engine speed sensor;
an air inlet temperature sensor;
a fuel flow sensor; and
an oil pressure sensor.

12. The system of claim 11, wherein the inputs further comprise sensor data from the boost pressure sensor, the boost temperature sensor, the at least one piston cooling jet pressure sensor, the coolant temperature sensor, the torque value sensor, the engine exhaust temperature sensor, the ambient air pressure sensor, the engine speed sensor, the air inlet temperature sensor, the fuel flow sensor, and the oil pressure sensor.

13. The system of claim 8, wherein the artificial neural network is trained via a process comprising:
receiving, at a training processor, training data of a training engine, the training data comprising sensor information collected over a training period of the training engine, the sensor information comprising inputs to the training engine which correspond to the data of the engine;

receiving, at the training processor from a turbocharger speed sensor, training turbocharger data;

performing, via the training processor on each input within the sensor information, a regression analysis, thereby identifying a relative relevance of each input with respect to the training turbocharger data, resulting in a relevance ranking for each input in the inputs;

iteratively, via the training processor:
modeling, using the relevance ranking and the inputs, the turbocharger speed sensor; and
selecting a plurality of inputs from the inputs based on the relevance ranking, such that an accuracy of the modeling does not drop below a threshold accuracy, resulting in an optimized set of inputs;

iteratively, via the training processor, programming a state-based neural network based on the optimized set of inputs, resulting in a programmed state-based neural network; and converting, via the training processor, the programmed state-based neural network into the artificial neural network by converting the programmed state-based neural network into a code based neural network executable by the processor.

14. The system of claim 8, wherein the engine is a diesel engine.

15. The system of claim 8, further comprising:
a non-transitory computer-readable medium storing, prior to execution by the processor, the artificial neural network.

16. The system of claim 8, wherein the system excludes a turbocharger speed sensor associated with the turbocharger in the engine.

17. A vehicle comprising:
an engine with a turbocharger;
an exhaust manifold pressure sensor which detects exhaust manifold pressure of the engine;
an exhaust mass flow sensor which detects exhaust mass flow of the engine;

an injection angle sensor which detects a fuel injection angle of the engine; and a processor which:
  receives, as inputs:
    the exhaust manifold pressure from the exhaust manifold pressure sensor;
    the exhaust mass flow from the exhaust mass flow sensor; and
    the fuel injection angle from the injection angle sensor;
  enters inputs into an artificial neural network;
  determines a speed of the turbocharger using the artificial neural network, wherein the artificial neural network is trained to receive the inputs and output the speed of the turbocharger; and
  modifies a rate of speed of cylinders in the engine based on the speed of the turbocharger.

18. The vehicle of claim 17, further comprising:
a boost pressure sensor;
a boost temperature sensor;
at least one piston cooling jet pressure sensor;
a coolant temperature sensor; and a torque value sensor.

19. The vehicle of claim 18, wherein the inputs further comprise sensor data from the boost pressure sensor, the boost temperature sensor, the at least one piston cooling jet pressure sensor, the coolant temperature sensor, and the torque value sensor.

20. The vehicle of claim 18, further comprising:
an engine exhaust temperature sensor;
an ambient air pressure sensor;
an engine speed sensor;
an air inlet temperature sensor;
a fuel flow sensor; and
an oil pressure sensor.

21. A method for emulating a turbocharger speed sensor of a turbocharger in an engine, the method comprising:
  receiving, at a processor, data from a plurality of sensors in the engine;
  entering, via the processor, the data as inputs into an artificial neural network; and
  receiving, at the processor, the speed of the turbocharger from the artificial neural network, wherein the artificial neural network is trained to receive the inputs and output the speed of the turbocharger; and
  modifying a rate of speed of cylinders in the engine based on the speed of the turbocharger.

22. The method of claim 21, wherein the data comprises an exhaust manifold pressure of the engine.

23. The method of claim 21, wherein the data comprises an exhaust mass flow of the engine.

24. The method of claim 21, wherein the data comprises an injection angle of fuel in the engine.

25. A vehicle comprising:
an engine with a turbocharger;
an exhaust manifold pressure sensor which detects exhaust manifold pressure of the engine; and
a processor which:
  receives, as input, the exhaust manifold pressure from the exhaust manifold pressure sensor;
  enters the input into an artificial neural network;
  determines a speed of the turbocharger using the artificial neural network, wherein the artificial neural network is trained to receive the inputs and output the speed of the turbocharger; and
  modifies a rate of speed of cylinders in the engine based on the speed of the turbocharger.

26. A vehicle comprising:
an engine with a turbocharger;
an exhaust mass flow sensor which detects exhaust mass flow of the engine; and a processor which:
  receives, as input, the exhaust mass flow from the exhaust mass flow sensor;
  enters the input into an artificial neural network;
  determines a speed of the turbocharger using the artificial neural network, wherein the artificial neural network is trained to receive the inputs and output the speed of the turbocharger; and
  modifies a rate of speed of cylinders in the engine based on the speed of the turbocharger.

27. A vehicle comprising:
an engine with a turbocharger;
an injection angle sensor which detects a fuel injection angle of the engine; and a processor which:
  receives, as input, the fuel injection angle from the injection angle sensor;
  enters the input into an artificial neural network;
  determines a speed of the turbocharger using the artificial neural network, wherein the artificial neural network is trained to receive the inputs and output the speed of the turbocharger; and
  modifies a rate of speed of cylinders in the engine based on the speed of the turbocharger.

* * * * *